United States Patent
Ramsl

(10) Patent No.: US 11,874,798 B2
(45) Date of Patent: Jan. 16, 2024

(54) SMART DATASET COLLECTION SYSTEM

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 68 days.

(21) Appl. No.: 17/486,554

(22) Filed: Sep. 27, 2021

(65) Prior Publication Data

US 2023/0096118 A1 Mar. 30, 2023

(51) Int. Cl.
*G06F 16/16* (2019.01)
*G06F 16/34* (2019.01)
*G06F 40/40* (2020.01)
*G06F 16/18* (2019.01)

(52) U.S. Cl.
CPC ........ *G06F 16/164* (2019.01); *G06F 16/1873* (2019.01); *G06F 16/345* (2019.01); *G06F 40/40* (2020.01)

(58) Field of Classification Search
None
See application file for complete search history.

(56) References Cited

U.S. PATENT DOCUMENTS

| | | | |
|---|---|---|---|
| 7,269,587 B1 * | 9/2007 | Page | G06F 16/3346 |
| 8,156,056 B2 * | 4/2012 | Luege Mateos | G06F 16/337 706/20 |
| 9,418,375 B1 * | 8/2016 | Cunico | G06F 16/36 |
| 10,210,551 B1 * | 2/2019 | Todd | G06F 16/25 |
| 2013/0086036 A1 * | 4/2013 | Rizzo | G06F 16/951 707/723 |
| 2018/0143971 A1 * | 5/2018 | Dubs | G06F 40/232 |
| 2020/0311107 A1 * | 10/2020 | Crawford | G06N 10/00 |
| 2021/0112101 A1 * | 4/2021 | Crabtree | H04L 63/1425 |
| 2021/0117474 A1 * | 4/2021 | Syed | G06F 16/9038 |
| 2021/0279637 A1 * | 9/2021 | Inoue | G06N 20/00 |

FOREIGN PATENT DOCUMENTS

| | | | | |
|---|---|---|---|---|
| CN | 111597328 A | * | 8/2020 | ......... G06F 16/3344 |
| CN | 113326198 A | * | 8/2021 | .......... G06F 11/3692 |

* cited by examiner

*Primary Examiner* — Hosain T Alam
*Assistant Examiner* — Anthony G Gemignani
(74) *Attorney, Agent, or Firm* — SCHWEGMAN LUNDBERG & WOESSNER, P.A.

(57) ABSTRACT

Datasets are available from different dataset servers and often lack well-defined metadata. Thus, comparing datasets is difficult. Additionally, there might be different versions of the same dataset which makes the search even more difficult. Using systems and methods described herein, quality scores, dataset versioning, topic identification, and semantic relatedness metadata is stored about datasets stored on dataset servers. A user interface is provided to allow a user to search for datasets by specifying search criteria (e.g., a topic and a minimum quality score) and to be informed of responsive datasets. The user interface may further inform the user of the quality scores of the responsive datasets, the versions of the responsive datasets, or other metadata. From the search results, the user may select and download one or more of the responsive datasets.

20 Claims, 11 Drawing Sheets

500

| ENGLISH MAPPING TABLE | |
|---|---|
| WORD | VECTOR |
| DATA | (0, 0.2, 0, 0.3, ...) |
| FUNCTION | (0.15, 0, 0.1, ...) |
| PARAMETER | (0, 0.1, 0, 0.1, ...) |

| DATASET TABLE | | |
|---|---|---|
| DATASET ID | SERVER | TOPIC |
| 1 | HOST1.COMPANY1.COM | CAR SALES |
| 2 | HOST2.COMPANY1.COM | IMAGE RECOGNITION |
| 3 | HOST3.COMPANY2.COM | IMAGE RECOGNITION |

| VERSION TABLE | | |
|---|---|---|
| DATASET ID | VERSION | LOCATION |
| 1 | 1 | CARS2020 |
| 1 | 2 | CARS2021 |
| 2 | 1 | IMAGES/V1 |
| 2 | 2 | IMAGES/V2 |
| 3 | 1 | TESTSET |

*FIG. 5*

| QUALITY TABLE | | |
|---|---|---|
| DATASET ID | VERSION | QUALITY SCORE |
| 1 | 1 | 0.5 |
| 1 | 2 | 0.8 |
| 2 | 1 | 0.9 |
| 2 | 2 | 0.7 |
| 3 | 1 | 0.4 |

*FIG. 6*

SMART DATASET COLLECTION SYSTEM

TECHNICAL FIELD

The subject matter disclosed herein generally relates to collection of one or more datasets. Specifically, the present disclosure addresses systems and methods to provide versioning, quality control, metadata generation, linking, and summarization of datasets.

BACKGROUND

Datasets are used for forecasting and machine learning. Datasets may include economic time series, weather observations, purchase data, customer data, and the like. The quality of datasets varies, but many software products and applications require high-quality data to generate good results.

BRIEF DESCRIPTION OF THE DRAWINGS

FIGS. 5-6 are block diagrams of an example database schema, suitable for use in smart dataset collection.

DETAILED DESCRIPTION

Figure 1:
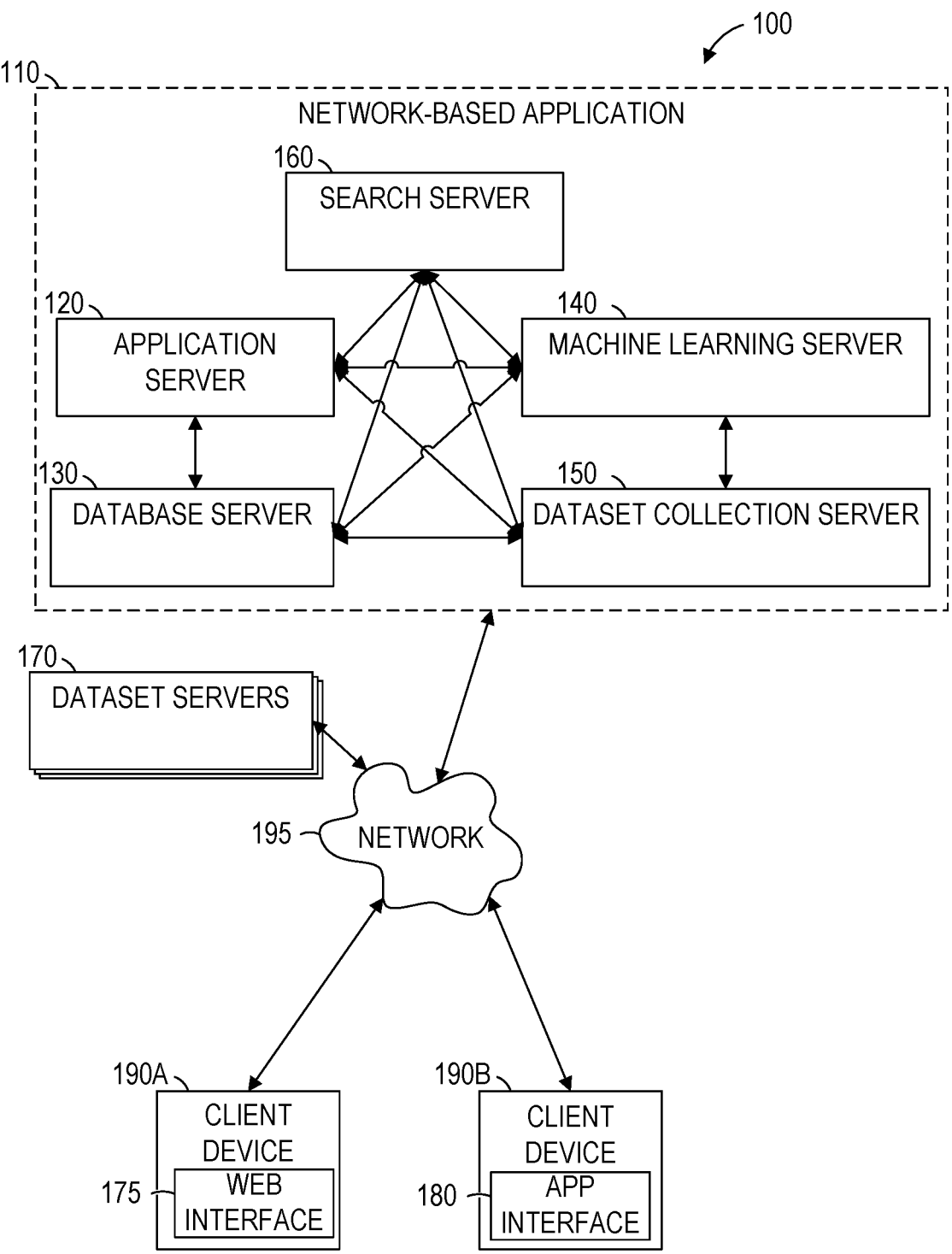
FIG. 1 is a network diagram illustrating an example network environment suitable for smart dataset collection.

Example methods and systems are directed to generating metadata for datasets, storing metadata for datasets, and using stored metadata to facilitate searching for datasets. In enterprise scenarios, datasets are used to forecast future events. Examples for datasets can be economic time series, weather forecasts for agricultural and insurance companies or usage data of huge human resources (HR) systems. Many software products and applications rely on high-quality data. Some datasets may be acquired from trusted organizations (such as the linguistic data consortium) for use as training data in training machine learning models.

The main challenge for acquired datasets is that there are many different datasets which often lack well-defined metadata. Additionally, the datasets are mostly stored in silos and are not accessible to all members of an enterprise. A further challenge is that for each dataset in the dataset collection, the data grows or is adjusted. As a result, there might be different versions of the same dataset which makes the search even more difficult.

The systems and methods described herein allow for storage of datasets in a systematic manner. Dataset versioning allows changes in a given dataset to be tracked. A quality score measures accuracy, timeliness, consistency, errors, or any suitable combination of these in the datasets. Topics of datasets may be identified using topic models (e.g., Latent Dirichlet Allocation). Based on topics and word embeddings, a semantic relatedness score may be calculated for each dataset pair. The semantic relatedness scores may be used to provide a recommendation for alternatives when a dataset does not fulfill its intended purpose in an application. Natural language generation may be used to create a summary of each dataset in an easy-to-understand human-readable format. The versions, quality scores, topics, semantic relatedness scores, and summaries may be stored as metadata associated with the datasets.

A user may search for datasets using a user interface that allows the user to specify search criteria (e.g., a topic) and be informed of responsive datasets. The user interface may further inform the user of the quality scores of the responsive datasets, the versions of the responsive datasets, or other metadata. From the search results, the user may select and download one or more of the responsive datasets.

By comparison with existing methods of searching for datasets, the methods and systems discussed herein improve functionality by providing for a database with metadata for datasets from multiple sources. Thus, instead of finding and considering datasets individually, the user is enabled to search by topic and quality score to identify responsive datasets. Additionally, methods and systems discussed herein reduce the level of effort expended in searching for and identifying existing datasets, reducing the probability that equivalent datasets will be generated again.

When these effects are considered in aggregate, one or more of the methodologies described herein may obviate a need for certain efforts or resources that otherwise would be involved in searching for datasets. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for source code discovery and generating consolidation recommendations. The network environment 100 includes a network-based application 110, one or more dataset servers 170, client devices 190A and 190B, and a network 195. The network-based application 110 is provided by application server 120 in communication with a database server 130, a machine learning server 140, a dataset collection server 150, and a search server 160. The application server 120 accesses application data (e.g., application data stored by the database server 130) to provide one or more applications to the client devices 190A and 190B via a web interface 175 or an application interface 180.

The application server 120, the database server 130, the machine learning server 140, the data collection server 150, the search server 160, the dataset servers 170, and the client devices 190A and 190B may each be implemented in a computer system, in whole or in part, as described below with respect to FIG. 11. The client devices 190A and 190B may be referred to collectively as client devices 190 or generically as a client device 190. The one or more dataset servers 170 may be referred to collectively as dataset servers 170 or generically as a dataset server 170.

Each of the dataset servers 170 hosts one or more datasets. The datasets may be accessed by the client devices 190, the dataset collection server 150, and the search server 160 via the network 195. The dataset collection server 150 accesses the datasets provided by the dataset servers 170, generates metadata for the accessed datasets, and stores the generated metadata in a database provided by the database server 130.

The search server 160 provides a user interface to the client devices 190 (e.g., the web interface 175 or the app interface 180) to allow a user to search for datasets. The search criteria provided via the user interface is used in conjunction with the stored metadata to identify responsive datasets. The user selects one or more responsive datasets and is connected to the dataset servers 170 hosting the responsive datasets. Thus, the user is enabled to find datasets hosted by multiple dataset servers 170 through a single interface.

The machine learning server 140 accesses training data from the database server 130. Using the training data, the machine learning server 140 trains a machine learning model to generate embedding vectors for datasets. For example, each word in text in a dataset may be converted to an embedding vector and the embedding vectors for the words in the dataset may be averaged to generate a single vector for the entire dataset. Multiple machine learning models may be used (e.g., one for each natural language). The Python library MUSE: Multilingual Unsupervised and Supervised Embeddings may be used to generate the embeddings, to create an alignment between the monolingual embeddings using bilingual dictionaries, or both.

As used herein, "embedding" refers to the conversion of human-readable words (in a natural language or a programming language) into multidimensional vectors suitable for computer processing. The vectors may be of one hundred dimensions or more, and thus are not suitable for manual calculation. Training of the language embeddings may be supervised or unsupervised. Supervised training takes labeled data as input. Unsupervised training learns from unlabeled data.

Multiple machine learning models may be trained by the machine learning server 140 to perform different functions. For example, a machine learning model may be trained to evaluate dataset quality. As another example, a machine learning model may be trained to evaluate dataset timeliness.

The search server 160 provides search functionality to the client devices 190 to search for datasets. Search criteria provided via the web interface 175 or the app interface 180 are converted to a vector. Based on the vectors generated for the datasets and the vector generated for the search criteria, one or more datasets are identified that are responsive to the search criteria. In response to the received search criteria, a user interface is presented on the client device 190 that identifies one or more of the responsive datasets.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the machine learning server 140, the dataset collection server 150, the search server 160, the dataset servers 170, and the client devices 190A-190B are connected by the network 195. The network 195 may be any network that enables communication between or among machines, databases, and devices. Accordingly, the network 195 may be a wired network, a wireless network (e.g., a mobile or cellular network), or any suitable combination thereof. The network 195 may include one or more portions that constitute a private network, a public network (e.g., the Internet), or any suitable combination thereof.

Figure 2:
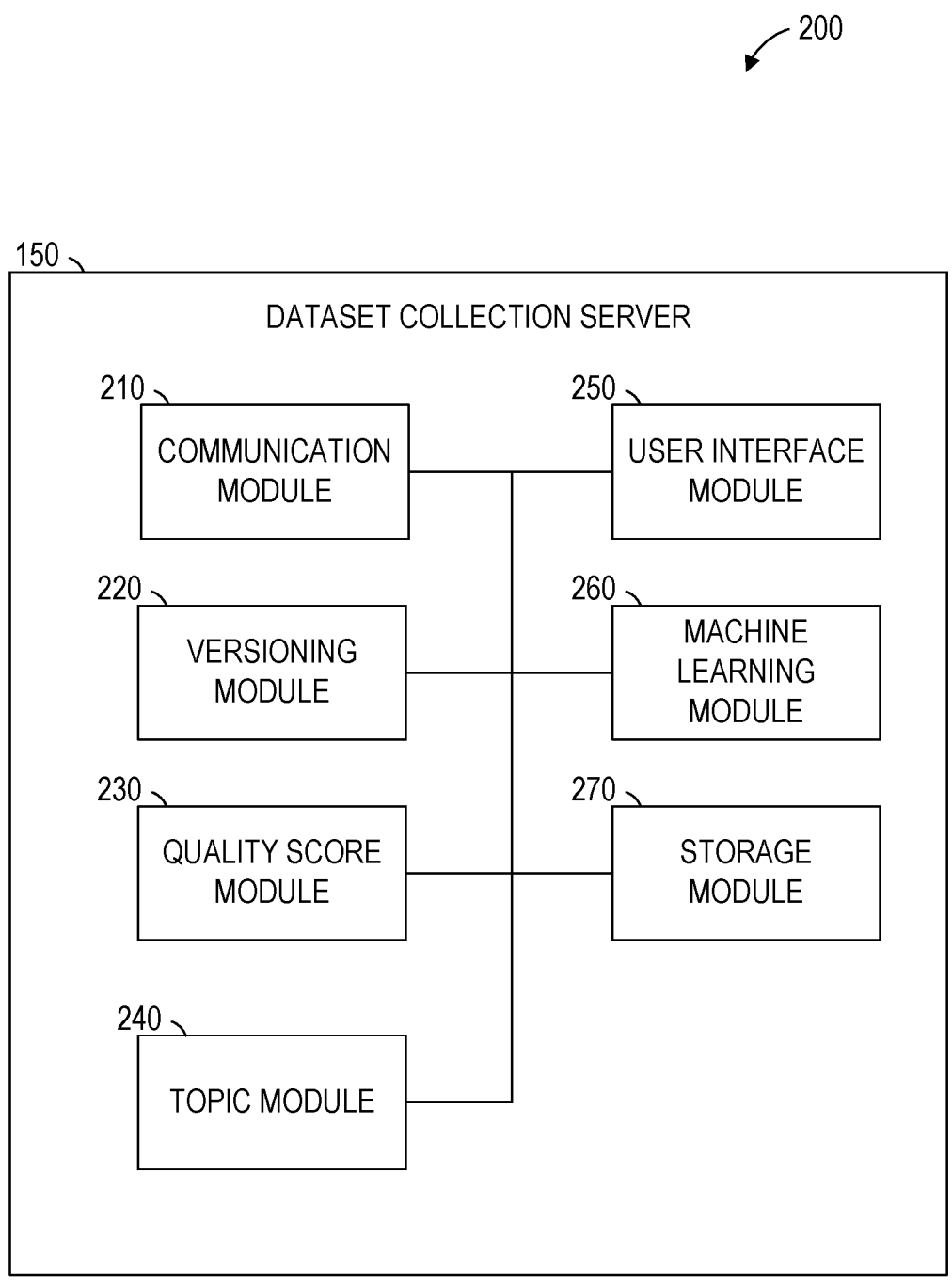
FIG. 2 is a block diagram of an example dataset collection server, suitable for smart dataset collection.

FIG. 2 is a block diagram 200 of an example dataset collection server 150, suitable for smart dataset collection. The dataset collection server 150 is shown as including a communication module 210, a versioning module 220, a quality score module 230, a topic module 240, a user interface module 250, a machine learning module 260, and a storage module 270, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the dataset collection server 150 and transmits data from the dataset collection server 150. For example, the communication module 210 may receive, from the client device 190A or 190B, search criteria for searching for datasets. The search criteria may comprise keywords, a selection of languages, a selection of dataset servers, a selection of quality, a selection of timeliness, or any suitable combination thereof. The dataset metadata to be searched by the search server 160 may be stored on the data collection server 150 (e.g., on a hard drive) or in remote storage (e.g., a network storage device). Communications sent and received by the communication module 210 may be intermediated by the network 195.

The versioning module 220 determines the version of accessed datasets. For example, a modification date of an accessed dataset may be compared to a stored modification data for the dataset when it was previously accessed. If the modification date has changed, the currently accessed version of the dataset is different from the previously accessed version of the dataset. As another example, a dataset provider 170 may provide access to two versions of a dataset. The versioning module 220 may determine that the two datasets have substantial overlap and thus are not different datasets but different versions of a single dataset. Version information may be stored by the versioning module 220 using the storage module 270.

The quality score module 230 determines a quality score for each dataset. For example, the quality score may be based on the number spelling errors in text of the dataset. The quality score may also depend on accuracy, timeliness, source, and consistency of data in the dataset. Quality score information may be stored by the quality score module 230 using the storage module 270.

One or more topics may be determined for each dataset by the topic module 240. For example, embedding vectors for text of the dataset may be generated and divided into a predetermined number of clusters. Based on the embedding vectors of a predetermined set of topics, a topic may be selected for each cluster, resulting the predetermined number of topics for the dataset. Topic information may be stored by the topic module 240 using the storage module 270.

A user interface for collecting datasets is provided by the dataset collection server 150 using the user interface module 250. For example, a hypertext markup language (HTML) document may be generated by the user interface module 250, transmitted to a client device 190 by the communication module 210, and rendered on a display device of the client device 190 by a web browser executing on the client device 190. The user interface may comprise text fields, drop-down menus, and other inputs fields. The user interface may allow the user to identify one or more dataset servers 170, one or more datasets provided by the dataset servers 170, one or more versions of datasets provided by the dataset servers 170, or any suitable combination thereof. In response to the identification of the dataset servers, datasets, or versions, the dataset collection server 150 accesses the corresponding datasets for collection.

The search server 160 may use a similar collection of modules as the dataset collection server 150. A user interface for searching is provided by the search server 160 using the user interface module 250. For example, a hypertext markup language (HTML) document may be generated by the user interface module 250, transmitted to a client device 190 by the communication module 210, and rendered on a display device of the client device 190 by a web browser executing on the client device 190. The user interface may comprise text fields, drop-down menus, and other inputs fields. The user interface may also comprise results and recommendations.

The machine learning module 260 trains machine learning models to perform various functions based on training data. For example, a machine learning model may be trained using datasets with labeled topics. This machine learning model is trained to generate topics for datasets. Another machine learning model may be trained using datasets with labeled quality scores. This machine learning model is trained to generate quality scores for datasets.

Trained machine learning models, search queries, search results, or any suitable combination thereof may be stored and accessed by the storage module 270. For example, local storage of the dataset collection server 160, such as a hard drive, may be used. As another example, network storage may be accessed by the storage module 270 via the network 195.

Figure 3:
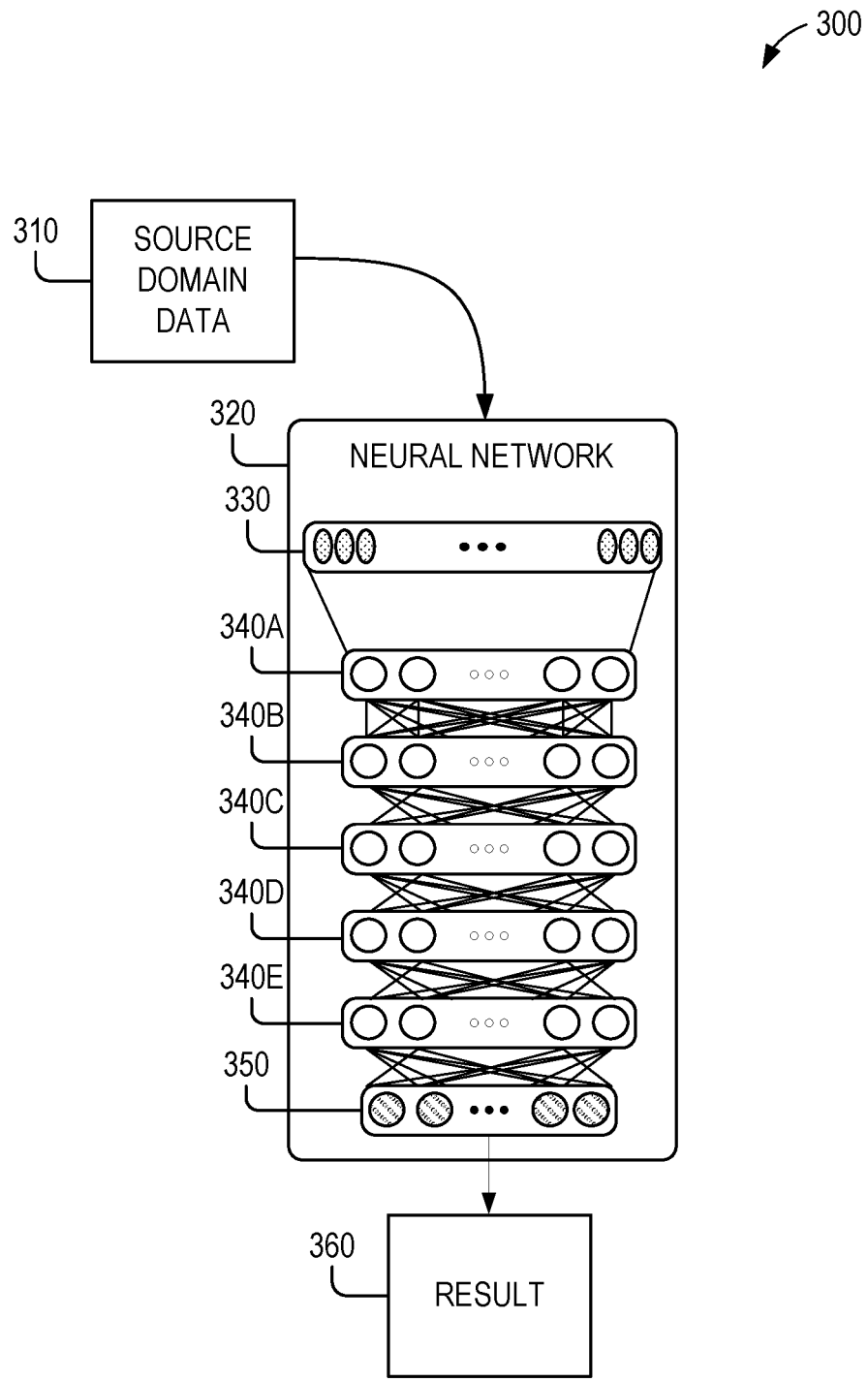
FIG. 3 is a block diagram of an example neural network, suitable for use in categorizing datasets, searching for datasets, or generating use recommendations for datasets.

FIG. 3 illustrates the structure of an example neural network 320. The neural network 320 takes source domain data 310 as input, processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and having learnt the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output, and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

In a supervised learning phase, a model is developed to predict the output for a given set of inputs, and is evaluated over several epochs to more reliably provide the output that is specified as corresponding to the given input for the greatest number of inputs for the training dataset. The training dataset comprises input examples with labeled outputs. For example, a user may label images based on their content and the labeled images used to train an image identifying model to generate the same labels.

For self-supervised learning, the training dataset comprises self-labeled input examples. For example, a set of color images could be automatically converted to black-and-white images. Each color image may be used as a "label" for the corresponding black-and-white image, and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to map to a desired result more closely, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, deep neural networks, genetic or evolutionary algorithms, and the like.

Figure 4:
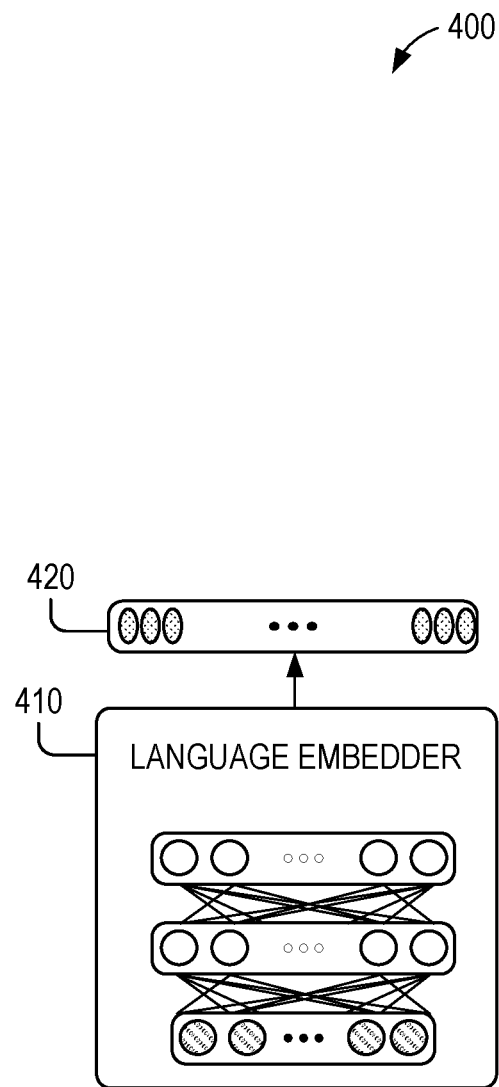
FIG. 4 is a block diagram of an example neural network, suitable for generating language embeddings for natural languages.

FIG. 4 is a block diagram of an example model architecture 400 for language embedding. The model architecture 400 includes a language embedder 410 and a resulting vector 420. The language embedder 410 is trained so that the distance (or loss) function for two related text strings is reduced or minimized. For example, synonymous natural language text or programming language text may be provided as inputs and the language embedder 410 trained to minimize the distance between the resulting vectors.

The specific architecture of the language embedder 410 may be chosen dependent on the type of input data for an embedding layer that is followed by some encoder architecture that creates a vector from the sequence. Embeddings and encoder parameters are shared between the text fields. In the simplest case the encoder stage is just an elementwise average of the token embeddings.

Alternatively, the encoding may include converting pairs of words of the text to bigram vectors and combining the bigram vectors to generate a vector for the text. For example, the text "function performs" may have a corresponding vector as a bigram, rather than two separate vectors for "function" and "performs" that are combined. The text "This function processes incoming emails to detect junk" may be stripped of articles and prepositions and converted to vectors for each of the bigrams "This function," "function processes," "processes incoming," "incoming emails," "emails detect," and "detect junk." The vector for a text string may be determined as an average of the bigram vectors for the bigrams in the text string.

In some example embodiments, a pre-trained vector embedding is used rather than training an embedding on a training set. For example, the doc2vec embedding may be used.

FIGS. 5-6 are block diagrams of an example database schema 500, suitable for use in smart dataset collection. The database schema 500 includes, in FIG. 5, an English mapping table 510, a dataset table 540, and a version table 570. The English mapping table 510 includes rows 530A, 530B, and 530C of a format 520. The dataset table 540 includes rows 560A, 560B, and 560C of a format 550. The version table 570 includes rows 590A, 590B, and 590C of a format 580.

Each row of the English mapping table 510 contains the embedding vector for an input English word. The contents of the English mapping table 510 may be generated by the trained language embedder 410 of FIG. 4. Once fully trained, the embeddings for a dictionary of English terms may be generated and stored in a database table for more efficient access. The embeddings may be accessed from the database table to generate vector representations of documentation in source code. Alternatively, the trained language embedder 410 may be used to generate embeddings dynamically, without the use of the English mapping table 510. The trained language embedder 410 may be able to generate accurate embeddings for variations of words or phrases not found in the dictionary.

The format 550 of the dataset table 540 indicates that each of the rows 560A-560C includes a dataset identifier, a server name, and a topic for a dataset. Thus, dataset 1 is hosted on host1.company1.com; dataset 2 is hosted on a different node (host2) of the same domain (company1.com); and dataset 3 is hosted on host3.company2.com, a different domain. Dataset 1 is a "car sales" dataset; datasets 2 and 3 are "image recognition" datasets.

Each row 590A-590C of the version table 570 identifies an individual version of one of the datasets in the dataset table 540 and a location for that version on the server for the dataset, as shown by the format 580. Thus, the rows 590A and 590B show that there are two versions of the first dataset and their locations. In some example embodiments, a uniform resource locator (URL) for a dataset may be formed by combining the server for the dataset with the location for the version according to a predetermined format. For example, version 2 of dataset 1 may be found at https://host1.company1.com/cars2021.

The database schema 500 includes, in FIG. 6, a quality table 610. The quality table 610 includes rows 630A, 630B, 630C, 630D, and 630E of a format 620.

The quality table 610 includes one row for each version of each dataset. The quality score for each version of each dataset may be based on analysis of the data of the dataset, such as a count of misspellings in text, a comparison of overlapping values of the dataset with a trusted dataset, an age of the dataset, a number of error reports for the dataset, a source of the dataset (e.g., whether the source is trusted or not) or any suitable combination thereof. The quality score may be in a range of 0 to 1, with higher scores indicating higher quality data.

For the purposes of example, only a few rows and columns are shown in each table of the database schema 500. Additional columns in one or more of the tables may serve to identify one or more of the authors, owners, creation date, or modification date associated with the datasets, the versions, the quality scores, or any suitable combination thereof. Additional tables may also be used, such as additional mapping tables for additional natural languages. Alternatively, one or more tables of the database schema 500 may be combined.

Figure 7:
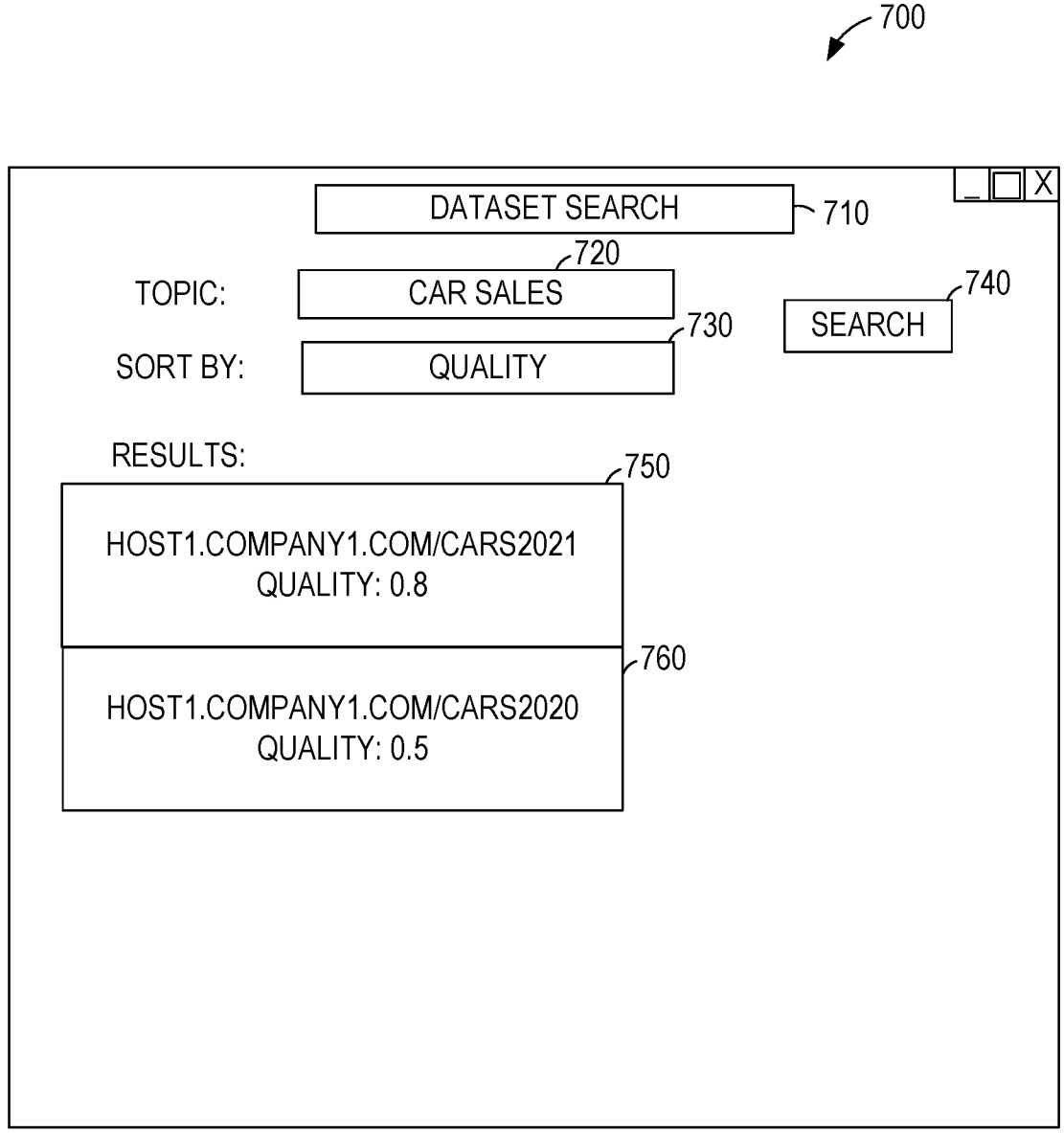
FIG. 7 is a block diagram of an example user interface for searching for datasets and presenting search results.

FIG. 7 is a block diagram of an example user interface 700 for searching for datasets and presenting search results. The user interface 700 includes a title 710; input fields 720 and 730; button 740; and search results 750 and 760. The user interface 700 may be displayed on a display device of the client device 190A or 190B in response to a request from a user of the client device 190A or 190B. For example, a user may press a button on a user interface that causes the user interface 700 to be presented (e.g., by causing the search server 160 to generate an HTML document and provide it to the client device 190A for rendering the user interface 700 on a display device of the client device 190A).

The title 710 indicates that the user interface 700 is for a dataset search. The user interacts with the input fields 720 and 730 to provide the criteria for the search. For example, the input field 720 may be implemented as a drop-down selector that allows the user to select a topic from a set of predefined topics. The input field 730 may be implemented as a drop-down selector that allows the user to enter one or more criteria for sorting search results (e.g., highest quality first, most recent first, largest dataset first, preferred servers first, or any suitable combination thereof). After providing the search criteria, the user may press the button 740 to submit the search criteria to the search server 160 via the network 195.

In response to receiving the search criteria, the search server 160 accesses data from the database server 130 (e.g., data stored according to the schema 500) and identifies zero or more search results. The search server 160 selects zero or more of the identified search results and provides them to the client device 190A for display in the user interface 700. In the example of FIG. 7, two search results 750-760 are provided and displayed. Thus, in the example of FIG. 7, the search request comprises a topic and the providing of the results is based on the topics of the datasets and the topic of the search request.

Information about the search results 750-760 is displayed. In the example of FIG. 7, the displayed information includes the server hosting the dataset, the location of the dataset on the hosting server, and the quality score of the dataset. More or fewer pieces of information may be displayed. For example, a creation date, a last modified date, a creator name, a measure of quantity (e.g., total size of the dataset measured in records, total size of the dataset measured in bytes, or the like), a version number, or any suitable combination thereof may be included.

The search results 750-760 may be operable to cause the dataset corresponding to the search result to be accessed. For example, the dataset may be transferred from the dataset host to the client device 190A.

By use of the user interface 700, a user is enabled to search multiple dataset servers to identify datasets that match the user's search criteria. By accessing existing datasets using a centralized interface, the user is saved the effort of searching each dataset server individually. Additionally, the search server provides quality information that may not be available from the dataset servers.

Figure 8:
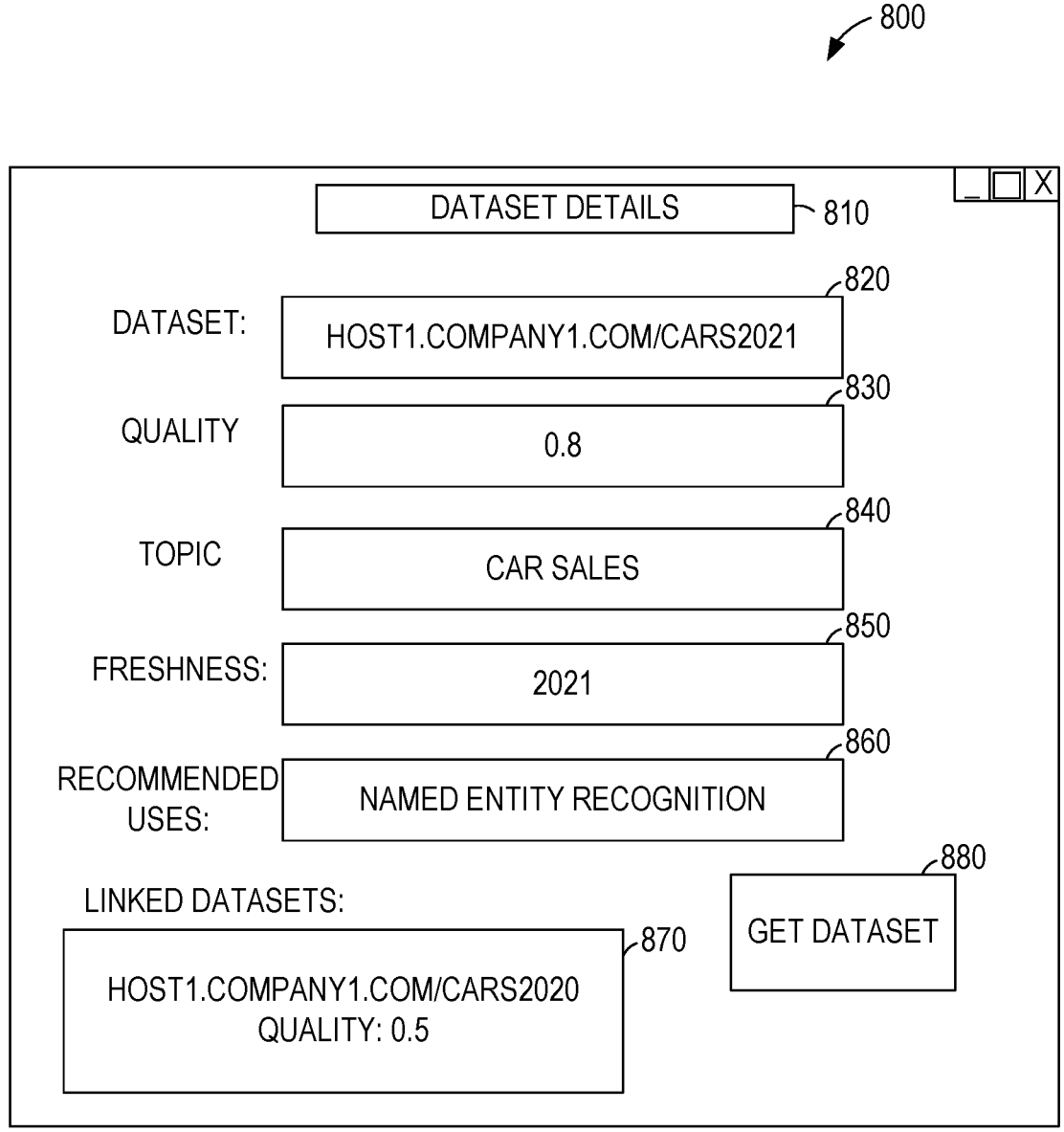
FIG. 8 is a block diagram of an example user interface for presenting dataset details.

FIG. 8 is a block diagram of an example user interface 800 for presenting dataset details. The user interface 800 includes a title 810; data fields 820, 830, 840, 850, and 860; information area 870; and a button 880. The user interface 800 may be displayed on a display device of the client device 190A or 190B in response to a request from a user of the client device 190A or 190B. For example, a user may interact with one of the search results 750-760 of the user interface 700 to cause the user interface 800 to be displayed with details for the selected search result.

The title 810 indicates that the user interface 800 displays dataset details. The data fields 820-860 provide details for a dataset. The dataset is identified in the field 820. The fields 830-860 show the quality score, topic, and freshness of the identified dataset. The field 860 indicates one or more recommended uses for the dataset.

A trained machine learning model may be used to generate the recommended uses for the dataset. The input to the machine learning model may be a vector comprising the quality score, an identifier of the topic, the freshness, and statistical data regarding the dataset (e.g., number of records, average record size, data types in the dataset, and the like). The output of the machine learning model may be an identifier of a predicted most probable AI application (e.g., sentiment analysis, named entity recognition, image recognition, language embedding, and the like) or other recommended use for the dataset. The recommended use may be stored in the dataset table 540 or in a recommended use table.

Instead of generating a single recommended use for a dataset, the machine learning model may generate a vector output that comprises a suitability rating for the dataset for use in each of a plurality of applications. Alternatively, multiple machine learning models may be used, with each model determining a suitability rating for the dataset for use in an individual application. Thus, the machine learning module 260 of the dataset collection server 150 may determine, based on each dataset, a suitability rating of the dataset for each of a plurality of applications. The dataset collection server causes a user interface (e.g., the user interface 800) to be presented that indicates at least a subset of the determined suitability ratings. The suitability rating may be a floating-point value in the range of 0 to 1, with 0 indicating that the dataset is not suitable for use in a particular application and 1 indicating that the dataset is most suitable for use in the particular application.

The information area 870 indicates one or more datasets linked to the dataset identified in the field 820. For example, based on the topics of the datasets, a fast computation of similarity of datasets can be performed by considering the topical keywords as labels for specific dataset categories of similar documents. The higher the number or fraction of shared keywords, the higher the relatedness of datasets. Furthermore, text and image classification may help to separate different dataset domains (e.g.: automotive, legal, or marketing). Thus, when datasets are in the same dataset domain, the relatedness is increased. Datasets with relatedness to the identified dataset that exceeds a predetermined threshold may be indicated in the information area 870. Alternatively, the dataset with the greatest relatedness may be indicated in the information area 870. The information area 870 may be operable to cause the user interface 800 to be displayed for the linked dataset.

To retrieve the dataset identified in the field 820, the user may interact with the button 880. In response to detecting an interaction with the button 880, the dataset collection server redirects the web interface 175 of the client device 190A to the dataset server 170 hosting the identified dataset, allowing the client device 190A to download the dataset.

Figure 9:
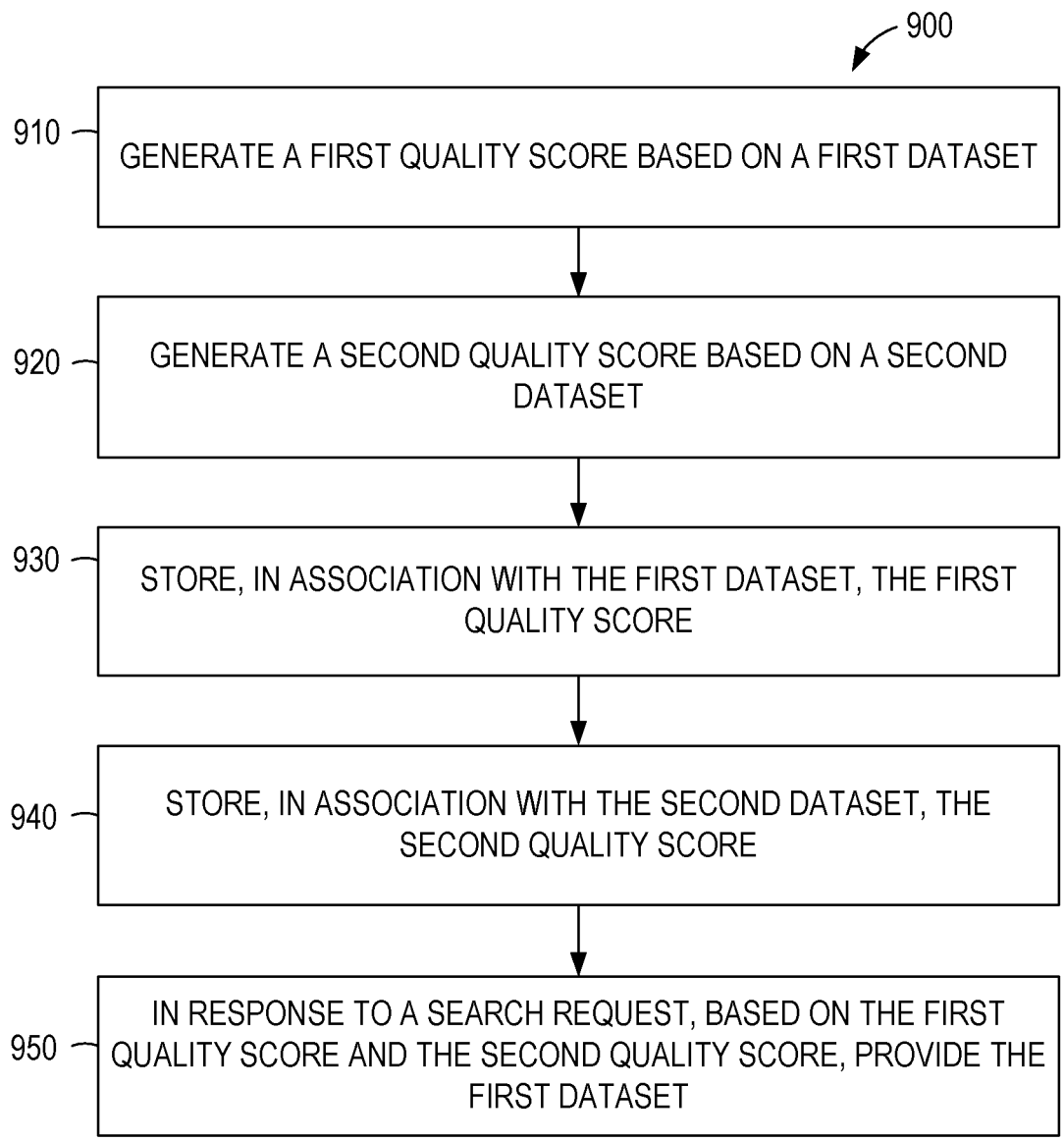
FIG. 9 is a flowchart illustrating operations of an example method suitable for generating metadata for datasets and using the metadata to provide search results.

FIG. 9 is a flowchart illustrating operations of an example method 900 suitable for generating metadata for datasets and using the metadata to provide search results. The method 900 includes operations 910, 920, 930, 940, and 950. By way of example and not limitation, the method 900 may be performed by the dataset collection server 150 and the search server 160 of FIG. 1, using the modules, databases, images, and user interfaces shown in FIGS. 2-7.

In operation 910, the quality score module 230 of the dataset collection server 150 generates a first quality score based on a first dataset. In operation 920, the quality score module 230 of the dataset collection server 150 generates a second quality score based on a second dataset. For example, the dataset collection server 150 may be provided a list of dataset servers 170 and use a web crawler application to identify datasets on each of the dataset servers 170. A quality score is generated for each accessed dataset. Thus, the first and second datasets may be datasets of different dataset servers 170, different versions of a dataset on a single dataset server 170, or unrelated datasets on a single dataset server 170.

The quality score may be based on the number of spelling errors in text of the dataset, a title of the dataset, a description of the dataset, or any suitable combination thereof. Spelling errors in the title of the dataset may be penalized more heavily than spelling errors in the description, which may be penalized more heavily than spelling errors in the data. The quality score may also depend on accuracy, timeliness, source, and consistency of data in the dataset. For example, a list of trusted sources may be checked and, if the dataset comes from a trusted source, the quality score for the dataset is increased by a predetermined amount. As another example, a list of distrusted sources may be checked and, if the dataset comes from a distrusted source, the quality score for the dataset is decreased by a predetermined amount. A trained machine learning model may receive the dataset as input and generate the quality score as output.

The quality score module 230 stores, in association with the first dataset, the first quality score (operation 930). The quality score module 230 also stores, in association with the second dataset, the second quality score (operation 940). Quality score information may be stored by the quality score module 230 in the quality table 610 using the storage module 270. As shown in FIG. 6, each row of the quality table 610 associates a quality score with a dataset.

In operation 950, the search server 160 provides the first dataset in response to a search request and based on the first quality score and the second quality score. For example, the search server 160 may search for records in the dataset table 540 that match criteria included in the search request and select among matching records based on quality scores stored in the quality table 610.

By way of example, the method 900 is described as performing operations 910-940 to generate and store quality scores for two datasets. However, the operations may be repeated for any number of datasets, allowing the dataset collection server to populate a database with information regarding a large number of datasets provided by a large number of different dataset servers.

In addition to or instead of determining a quality score for each accessed dataset, topics of datasets may be identified using topic models (e.g., Latent Dirichlet Allocation). Based on topics and word embeddings, a semantic relatedness score may be calculated for each dataset pair. The semantic relatedness scores may be used to provide a recommendation for alternatives when a dataset does not fulfill its intended purpose in an application. Natural language generation may be used to create a summary of each dataset in an easy-to-understand human-readable format. The versions, quality scores, topics, semantic relatedness scores, and summaries may be stored as metadata associated with the datasets (e.g., in the tables 540 and 610 of the schema 500 of FIGS. 5-6).

Based on the topic of each dataset, a "freshness" for the dataset may be determined. Data freshness describes how recent a specific dataset is. For example, a dataset about "Covid-19" (relating to events circa 2020) has a higher freshness than a dataset about "September 11 attacks" (relating to events in 2011). By querying the name of a dataset against knowledge bases such as DBpedia or custom knowledge bases, an estimation of freshness is inferred. The freshness may be a factor in determining the quality score for each dataset (e.g., datasets regarding more recent topics may be given higher quality scores than datasets regarding older topics).

Furthermore, the dataset collection server 150 may generate a vector representation of a semantic meaning of each dataset. For example, text of the dataset may be converted to vector representation using the vector embedder 300. The average of all vectors for the text may be computed and used as the vector representation of the semantic meaning of the dataset. The vectors for the datasets may be pairwise compared (e.g., by taking the cosine or Euclidean distance between the pairs of vectors) to determine a degree of similarity between each pair of datasets. Based on the determined degree of similarity and a predetermined threshold, the two datasets may be linked. Thus, the informational field 870 of FIG. 8 may be populated based on the semantic meanings of the datasets.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: generating, by one or more processors, a first quality score based on a first dataset; generating, by the one or more processors, a second quality score based on a second dataset; storing, in association with the first dataset, the first quality score; storing, in association with the second dataset, the second quality score; and in response to a search request, based on the first quality score and the second quality score, providing the first dataset.

In Example 2, the subject matter of Example 1 includes, generating, based on the first dataset, a first topic for the first dataset; and generating, based on the second dataset, a second topic for the second dataset; wherein the search request comprises a third topic and the providing of the first dataset is further based on the first topic, the second topic, and the third topic.

In Example 3, the subject matter of Example 2 includes, determining, based on the first topic, a freshness of the first dataset; wherein the generating of the first quality score is further based on the freshness of the first dataset.

In Example 4, the subject matter of Examples 1-3 includes, wherein: the generating of the first quality score based on the first dataset comprises determining a number of spelling errors in the first dataset.

In Example 5, the subject matter of Examples 1-4 includes, wherein: the generating of the first quality score is further based on a source of the first dataset.

In Example 6, the subject matter of Examples 1-5 includes, generating a first vector representation of a first semantic meaning of the first dataset; generating a second vector representation of a second semantic meaning of the second dataset; determining a degree of similarity between the first dataset and the second dataset based on the first vector representation and the second vector representation; and based on the determined degree of similarity and a predetermined threshold, linking the first dataset with the second dataset.

In Example 7, the subject matter of Examples 1-6 includes, determining, based on the first dataset, a suitability rating of the first dataset for each of a plurality of applications; and causing a user interface to be presented that indicates at least a subset of the determined suitability ratings.

Example 8 is a system comprising: a memory that stores instructions; and one or more processors configured by the instructions to perform operations comprising: generating a first quality score based on a first dataset; generating a second quality score based on a second dataset; storing, in association with the first dataset, the first quality score; storing, in association with the second dataset, the second quality score; and in response to a search request, based on the first quality score and the second quality score, providing the first dataset.

In Example 9, the subject matter of Example 8 includes, wherein the operations further comprise: generating, based on the first dataset, a first topic for the first dataset; and generating, based on the second dataset, a second topic for the second dataset; wherein the search request comprises a third topic and the providing of the first dataset is further based on the first topic, the second topic, and the third topic.

In Example 10, the subject matter of Example 9 includes, wherein the operations further comprise: determining, based on the first topic, a freshness of the first dataset; wherein the generating of the first quality score is further based on the freshness of the first dataset.

In Example 11, the subject matter of Examples 8-10 includes, wherein: the generating of the first quality score based on the first dataset comprises determining a number of spelling errors in the first dataset.

In Example 12, the subject matter of Examples 8-11 includes, wherein: the generating of the first quality score is further based on a source of the first dataset.

In Example 13, the subject matter of Examples 8-12 includes, wherein the operations further comprise: generating a first vector representation of a first semantic meaning of the first dataset; generating a second vector representation of a second semantic meaning of the second dataset; determining a degree of similarity between the first dataset and the second dataset based on the first vector representation and the second vector representation; and based on the determined degree of similarity and a predetermined threshold, linking the first dataset with the second dataset.

In Example 14, the subject matter of Examples 8-13 includes, wherein the operations further comprise: determining, based on the first dataset, a suitability rating of the first dataset for each of a plurality of applications; and causing a user interface to be presented that indicates at least a subset of the determined suitability ratings.

Example 15 is a non-transitory computer-readable medium that stores instructions that, when executed by one or more processors, cause the one or more processors to perform operations comprising: generating a first quality score based on a first dataset; generating a second quality score based on a second dataset; storing, in association with the first dataset, the first quality score; storing, in association with the second dataset, the second quality score; and in response to a search request, based on the first quality score and the second quality score, providing the first dataset.

In Example 16, the subject matter of Example 15 includes, wherein the operations further comprise: generating, based on the first dataset, a first topic for the first dataset; and generating, based on the second dataset, a second topic for the second dataset; wherein the search request comprises a third topic and the providing of the first dataset is further based on the first topic, the second topic, and the third topic.

In Example 17, the subject matter of Example 16 includes, wherein the operations further comprise: determining, based on the first topic, a freshness of the first dataset; wherein the generating of the first quality score is further based on the freshness of the first dataset.

In Example 18, the subject matter of Examples 15-17 includes, wherein: the generating of the first quality score based on the first dataset comprises determining a number of spelling errors in the first dataset.

In Example 19, the subject matter of Examples 15-18 includes, wherein: the generating of the first quality score is further based on a source of the first dataset.

In Example 20, the subject matter of Examples 15-19 includes, wherein the operations further comprise: generating a first vector representation of a first semantic meaning of the first dataset; generating a second vector representation of a second semantic meaning of the second dataset; determining a degree of similarity between the first dataset and the second dataset based on the first vector representation and the second vector representation; and based on the determined degree of similarity and a predetermined threshold, linking the first dataset with the second dataset.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 10:
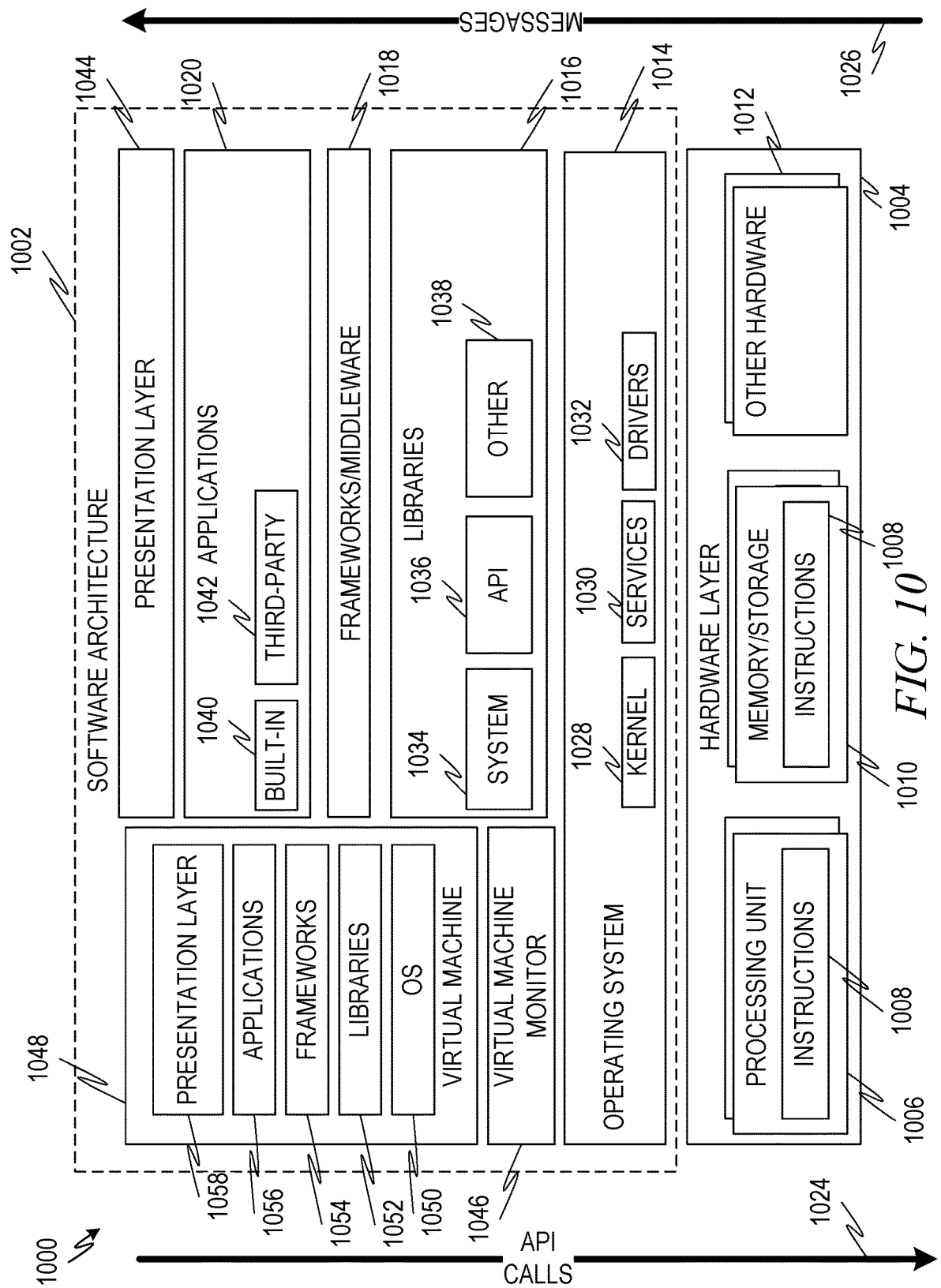
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the software architecture 1002.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system libraries 1034, API libraries 1036, and other libraries 1038), frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 11:
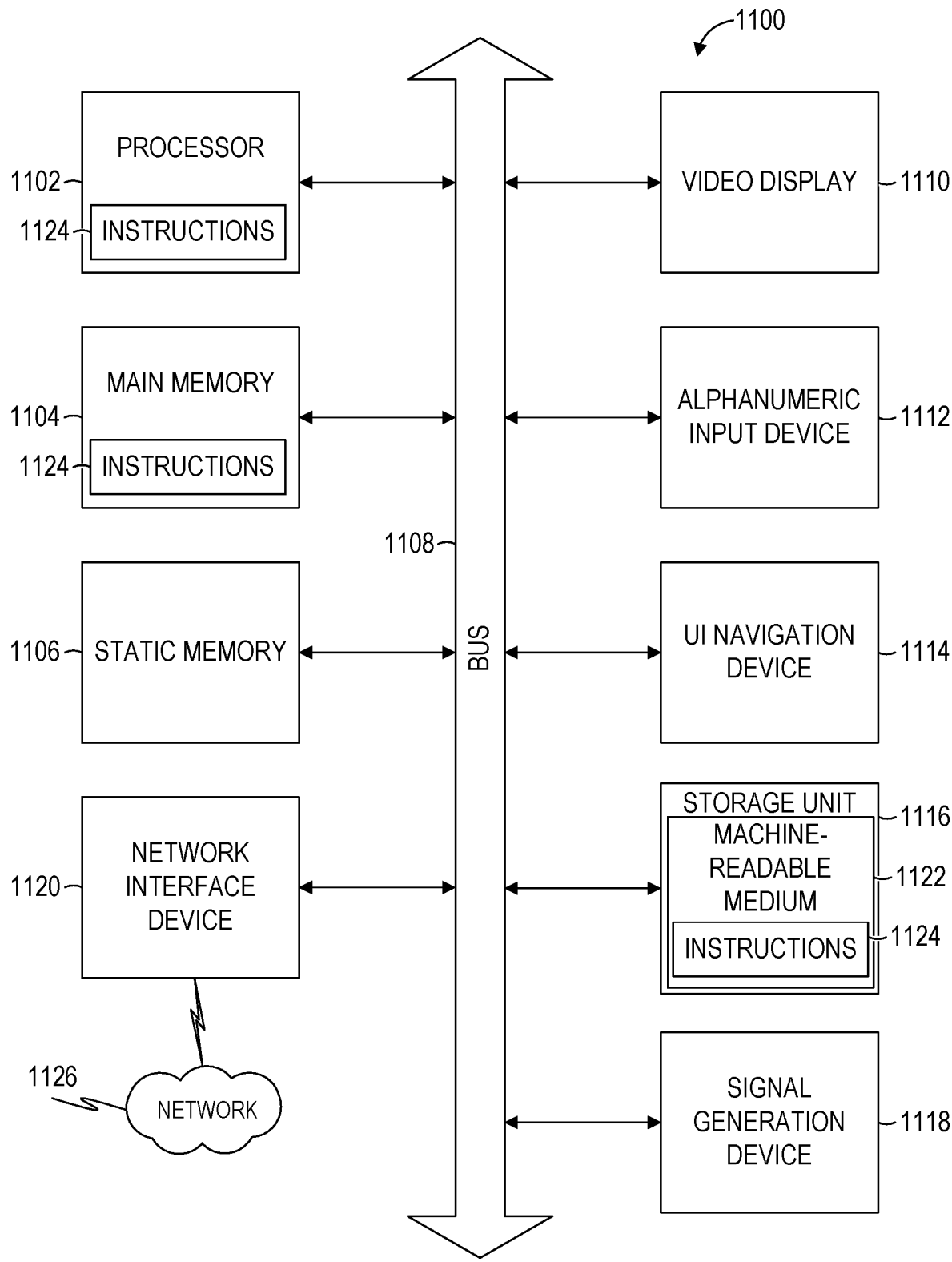
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in FIG. 11 to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving, by one or more processors and via a network, a plurality of datasets from a plurality of sources;
   generating, by the one or more processors, based on each dataset of the plurality of datasets, a topic for the dataset;
   determining, based on the topic for each dataset of the plurality of datasets, a freshness for the dataset;
   determining for each dataset of the plurality of datasets, a quality score for the dataset based on the dataset, the freshness of the dataset, and the source of the dataset;
   storing, in association with each dataset of the plurality of datasets, the quality score, the topic, and the freshness for the dataset;
   receiving, via a user interface, a search request comprising a search topic and sort criteria; and
   in response to the search request, based on the search topic, the topics for the plurality of datasets, and the quality scores for the plurality of datasets, causing a user interface to be presented that identifies a list of datasets corresponding to the search topic, the list ordered according to the sort criteria.

2. The method of claim 1, wherein:
   the generating of the quality score for each dataset of the plurality of datasets comprises determining a number of spelling errors in the dataset.

3. The method of claim 1, further comprising:
   generating a vector representation of a semantic meaning for each dataset of the plurality of datasets;
   determining a degree of similarity between a first dataset and a second dataset based on the vector representations for the first dataset and the second dataset; and
   based on the determined degree of similarity and a predetermined threshold, linking the first dataset with the second dataset.

4. The method of claim 1, further comprising:
   determining, based on each dataset of the plurality of datasets, a suitability rating of the dataset for each of a plurality of artificial intelligence (AI) applications; and
   causing a user interface to be presented that indicates at least a subset of the determined suitability ratings.

5. The method of claim 1, wherein the generating of the quality score for each dataset comprises determining whether the source for the dataset is trusted.

6. The method of claim 5, wherein the determining whether the source for the dataset is trusted comprising checking the source against a list of trusted sources.

7. The method of claim 1, wherein the determining, based on the topic for each dataset of the plurality of datasets, the freshness of the dataset comprises querying the topic against a knowledge base.

8. A system comprising:
a memory that stores instructions; and
one or more processors configured by the instructions to perform operations comprising:
receiving, via a network, a plurality of datasets from a plurality of sources;
generating, by the one or more processors, based on each dataset of the plurality of datasets, a topic for the dataset;
determining, based on the topic for each dataset of the plurality of datasets, a freshness for the dataset;
determining for each dataset of the plurality of datasets, a quality score for the dataset based on the dataset, the freshness of the dataset, and the source of the dataset;
storing, in association with each dataset of the plurality of datasets, the quality score, the topic, and the freshness for the dataset;
receiving, via a user interface, a search request comprising a search topic and sort criteria; and
in response to the search request, based on the search topic, the topics for the plurality of datasets, and the quality scores for the plurality of datasets, causing a user interface to be presented that identifies a list of datasets corresponding to the search topic, the list ordered according to the sort criteria.

9. The system of claim 8, wherein:
the generating of the quality score for each dataset of the plurality of datasets comprises determining a number of spelling errors in the dataset.

10. The system of claim 8, wherein the operations further comprise:
generating a vector representation of a semantic meaning for each dataset of the plurality of datasets;
determining a degree of similarity between a first dataset and a second dataset based on the vector representations for the first dataset and the second dataset; and
based on the determined degree of similarity and a predetermined threshold, linking the first dataset with the second dataset.

11. The system of claim 8, wherein the operations further comprise:
determining, based on each dataset of the plurality of datasets, a suitability rating of the dataset for each of a plurality of artificial intelligence (AI) applications; and
causing a user interface to be presented that indicates at least a subset of the determined suitability ratings.

12. The system of claim 8, wherein the generating of the quality score for each dataset comprises determining whether the source for the dataset is trusted.

13. The system of claim 12, wherein the determining whether the source for the dataset is trusted comprises checking the source against a list of trusted sources.

14. The system of claim 8, wherein the determining, based on the topic for each dataset of the plurality of datasets, the freshness of the dataset comprises querying the topic against a knowledge base.

15. A non-transitory computer-readable medium that stores instructions that, when executed by one or more processors, cause the one or more processors to perform operations comprising:
receiving, via a network, a plurality of datasets from a plurality of sources;
generating, by the one or more processors, based on each dataset of the plurality of datasets, a topic for the dataset;
determining, based on the topic for each dataset of the plurality of datasets, a freshness for the dataset;
determining for each dataset of the plurality of datasets, a quality score for the dataset based on the dataset, the freshness of the dataset, and the source of the dataset;
storing, in association with each dataset of the plurality of datasets, the quality score, the topic, and the freshness for the dataset;
receiving, via a user interface, a search request comprising a search topic and sort criteria; and
in response to the search request, based on the search topic, the topics for the plurality of datasets, and the quality scores for the plurality of datasets, causing a user interface to be presented that identifies a list of datasets corresponding to the search topic, the list ordered according to the sort criteria.

16. The non-transitory computer-readable medium of claim 15, wherein:
the generating of the quality score for each dataset of the plurality of datasets comprises determining a number of spelling errors in the dataset.

17. The non-transitory computer-readable medium of claim 15, wherein the operations further comprise:
generating a vector representation of a semantic meaning for each dataset of the plurality of datasets;
determining a degree of similarity between a first dataset and a second dataset based on the vector representations for the first dataset and the second dataset; and
based on the determined degree of similarity and a predetermined threshold, linking the first dataset with the second dataset.

18. The non-transitory computer-readable medium of claim 15, wherein the generating of the quality score for each dataset comprises determining whether the source for the dataset is trusted.

19. The non-transitory computer-readable medium of claim 18, wherein the determining whether the source for the dataset is trusted comprises checking the source against a list of trusted sources.

20. The non-transitory computer-readable medium of claim 15, wherein the determining, based on the topic for each dataset of the plurality of datasets, the freshness of the dataset comprises querying the topic against a knowledge base.

* * * * *